(12) United States Patent
Hu et al.

(10) Patent No.: US 9,025,467 B2
(45) Date of Patent: May 5, 2015

(54) HITLESS PROTECTION FOR TRAFFIC RECEIVED FROM 1+1 PROTECTING LINE CARDS IN HIGH-SPEED SWITCHING SYSTEMS

(75) Inventors: Junqiang Hu, Davis, CA (US); Philip N. Ji, Cupertino, CA (US); Ting Wang, Cupertino, CA (US); Yoshiaki Aono, Cupertino, CA (US)

(73) Assignees: NEC Laboratories America, Inc., Princeton, NJ (US); NEC Corporation (JP)

(*) Notice: Subject to any disclaimer, the term of this patent is extended or adjusted under 35 U.S.C. 154(b) by 369 days.

(21) Appl. No.: 13/543,570

(22) Filed: Jul. 6, 2012

(65) Prior Publication Data

US 2013/0084063 A1    Apr. 4, 2013

Related U.S. Application Data

(60) Provisional application No. 61/540,610, filed on Sep. 29, 2011.

(51) Int. Cl.
*G01R 31/08* (2006.01)
*H04W 4/00* (2009.01)
*H04L 12/933* (2013.01)

(52) U.S. Cl.
CPC .................................... *H04L 49/10* (2013.01)

(58) Field of Classification Search
None
See application file for complete search history.

(56) References Cited

U.S. PATENT DOCUMENTS

| 6,678,782 B1* | 1/2004 | Aydemir et al. ............... 710/316 |
| 7,656,791 B1 | 2/2010 | Mok |
| 8,522,103 B2* | 8/2013 | Kim et al. ..................... 714/748 |
| 2003/0210705 A1* | 11/2003 | Seddigh et al. ............... 370/419 |
| 2006/0056426 A1* | 3/2006 | Wakameda et al. ............ 370/401 |
| 2008/0126548 A1* | 5/2008 | Moore et al. .................. 709/227 |
| 2008/0253355 A1* | 10/2008 | Tominaga et al. ............. 370/350 |
| 2011/0235438 A1* | 9/2011 | Chin et al. ................. 365/189.05 |
| 2012/0106526 A1* | 5/2012 | Yousefi et al. ................ 370/338 |

OTHER PUBLICATIONS

Ksch, The Optical Core: Overlay Versus Peer-to-Peer Networking Models, Jan. 9, 2007, Telecommunications, pp. 1-4.*

* cited by examiner

*Primary Examiner* — Omar Ghowrwal
*Assistant Examiner* — Angel Brockman
(74) *Attorney, Agent, or Firm* — Joseph Kolodka

(57) ABSTRACT

A communication system includes a synchronous interface coupled to a switch fabric; cells for switching; and a 1+1 protection unit with a primary and back-up line cards.

22 Claims, 12 Drawing Sheets

FIG. 2

| TM interface header | Data | Flow ID | Sequence Num. |

FIG. 3

| TM interface header | Flow ID | Sequence Num. | Data |

FIG. 4

| TM interface header | 1 | Flow ID 7bit | Sequence Num. 8bit | Data |

HITLESS PROTECTION FOR TRAFFIC RECEIVED FROM 1+1 PROTECTING LINE CARDS IN HIGH-SPEED SWITCHING SYSTEMS

This application claims priority to Provisional Application Ser. No. 61/540,610 filed Sep. 29, 2011, the content of which is incorporated by reference.

BACKGROUND

The present invention relates to hitless protection for switching systems.

Ensuring no traffic loss becomes more and more important in today's telecommunication systems. Internet trading is one of the applications that require packet loss to be as low as possible; real-time Internet applications such as voice over IP and video conferences are coming to people's daily life, and packet loss is undesirable for causing of flickering noises on the phone lines or viewing distorted video clips. Service continuity is more critical comparing to traffic loss, so redundancy protection are always built into the tele-communications systems to avoid service interruption during system or link failure. Redundancy protection is the technique to provide a backup line card or fabric card and replace the primary one when failure occurs. The minimization of traffic loss when switching from the primary to the backup line card becomes important for the above application reasons.

Conventional communication systems typically have cell or packet based switch fabric and TDM (time-division multiplexing) line card(s) that switch the TDM traffic through the switch fabric to its destination line card(s). The TDM line card provides 1+1 card protection, where the protecting card processes traffic the same way as the working card. Hitless protection relates to the ability for the system to enter a protected mode without losing frame or framing synchronization when failure occurs, to ensure that the telecommunication equipment provides uninterrupted or continuous service and maintain an extremely high-reliability rating. This means no traffic loss or duplication is allowed when switched from primary to backup card. However, because of the delay uncertainty of traffic switching and failure reaction, traffic might encounter loss or corruption when failure happens.

Optical Transport Network (OTN) is believed to be the main solution for next generation optical core networks. It is composed of a set of Optical Network Elements connected by optical fiber links, able to provide functionality of transport, multiplexing, routing, management, supervision and survivability of optical channels carrying client signals. A distinguishing characteristic of the OTN is its provision of transport for any digital signal independent of client-specific aspects, i.e. client independence. ODU is the basic optical channel unit carried in OTN frame, organized in TDM pattern to provide both TDM and packet services. Several different rates of ODUs are defined, including ODU0~ODU4, ODUflex, and ODU2e etc., for different capacity. ODU multiplexing is defined for all the hierarchies, including mapping from ODU0 into ODU4. Telecommunication carriers are expecting next generation integrated optical core switching node to provide multi-service and all levels of ODU granularities.

FIG. 1 shows an exemplary conventional system 100. This system has client line cards to provide client interface 118, such as line card 102 and 104; core interface (TDM) line card with 1+1 protection to provide core connection 116, such line card 108 as primary and 110 as its backup; and fabric card 106 for switching (and 118 for switch fabric backup). For output traffic to core interface 116, module 112 works as a switch (further controlled by protection control signal 114) to select output from either primary or backup interface; for incoming traffic from core link 116, module 112 replicates (for example, through a signal splitter) the inputs to both primary and backup line cards.

SUMMARY

The preferred embodiment provides systems with cell switching, for traffic received from line card with 1+1 protection. The method given by preferred embodiment depends on the system configuration, using 1+1 switch fabric protection or 1:n switch fabric protection. In both cases, the destination port uses input buffer to support delayed read to enable traffic re-transmission or multiplexing from uncorrupted traffic.

One embodiment synchronously segments the incoming traffic in primary and backup line cards, and tags the segmented cells with the same labels which include sequence number and flow ID. In destination line card there is a buffer providing delayed read. When a cell is written into that buffer, its readout will be delayed for certain period, so that in case failure happens, it can avoid reading corrupted or invalid cells, either by selecting a different source, or by re-transmission from source port. In another embodiment, with 1+1 fabric protection, the destination line card receives traffic from both primary and backup line cards. The destination line card has two buffers, one for traffic from primary line card, and the other for traffic from backup one. These two buffers provide the function of delayed read. A multiplexer is provided following the two buffers, to select which buffer to read from. In one embodiment, if there is another buffer following the multiplexer, the one for traffic from primary (or working) line card can be eliminated, and the delayed read will be controlled in the buffer following multiplexer. In yet another embodiment, with 1:n fabric protection and 1+1 line card protection, a single copy is received in the destination line card, so it is the source line card's (in particular, the backup line card) responsibility to re-transmit the traffic that might be lost. The backup line card needs to be synchronized with primary line card in transmitting the traffic to switch fabric. In one embodiment, whenever the primary line card finishes the output of one cell, it sends the information to the backup one, so that the backup line card can release that cell from traffic manager main buffer. For the cells that might need to be re-transmitted, in one embodiment, the source port (backup line card) has a protecting buffer (or called re-transmission buffer), and for the cell to be released, it is read out from the main buffer and stored into the protecting buffer. In case protecting is triggered and re-transmission is needed, the source port will first read from the protecting buffer, and then continue with regular operation after re-transmission finishes. In one embodiment, the buffer is organized by time slot, and a "valid" bit is used in the buffer; in another embodiment, there are registers group to save the cells' starting address, and these registers are indexed by time slot. In one embodiment, no actual re-transmission buffers are used and the re-transmission is achieved by modifying the pointers to the main traffic queue. In destination port, buffer with delayed read is used, and the re-transmission is transparent. For system that uses traffic manager not supporting hitless protection, in another embodiment, the above mentioned solutions can be implemented in FPGA located between physical device and the traffic manager. In another embodiment, it can be located between traffic manager and switch fabric device, with the function of bridging control message between traffic manager and switch fabric, if in-band control is in use.

Advantages of the preferred embodiments may include one or more of the following. The invention provides systems with either 1+1 fabric card protection, or 1:n fabric card protection. The preferred embodiment provides a practical approach to achieve the required function, for application in high-speed like 100 Gb/s line rate systems. The system minimizes traffic loss and traffic duplication when re-transmission is needed.

BRIEF DESCRIPTION OF THE DRAWINGS

FIG. 2 shows one exemplary flow identification and sequence number at the end of a packet or cell.

FIG. 3 shows one exemplary flow identification and sequence number in front of data field.

FIG. 4 shows an exemplary use of one-bit to indicate TDM or packet traffic.

DESCRIPTION

Figure 1:
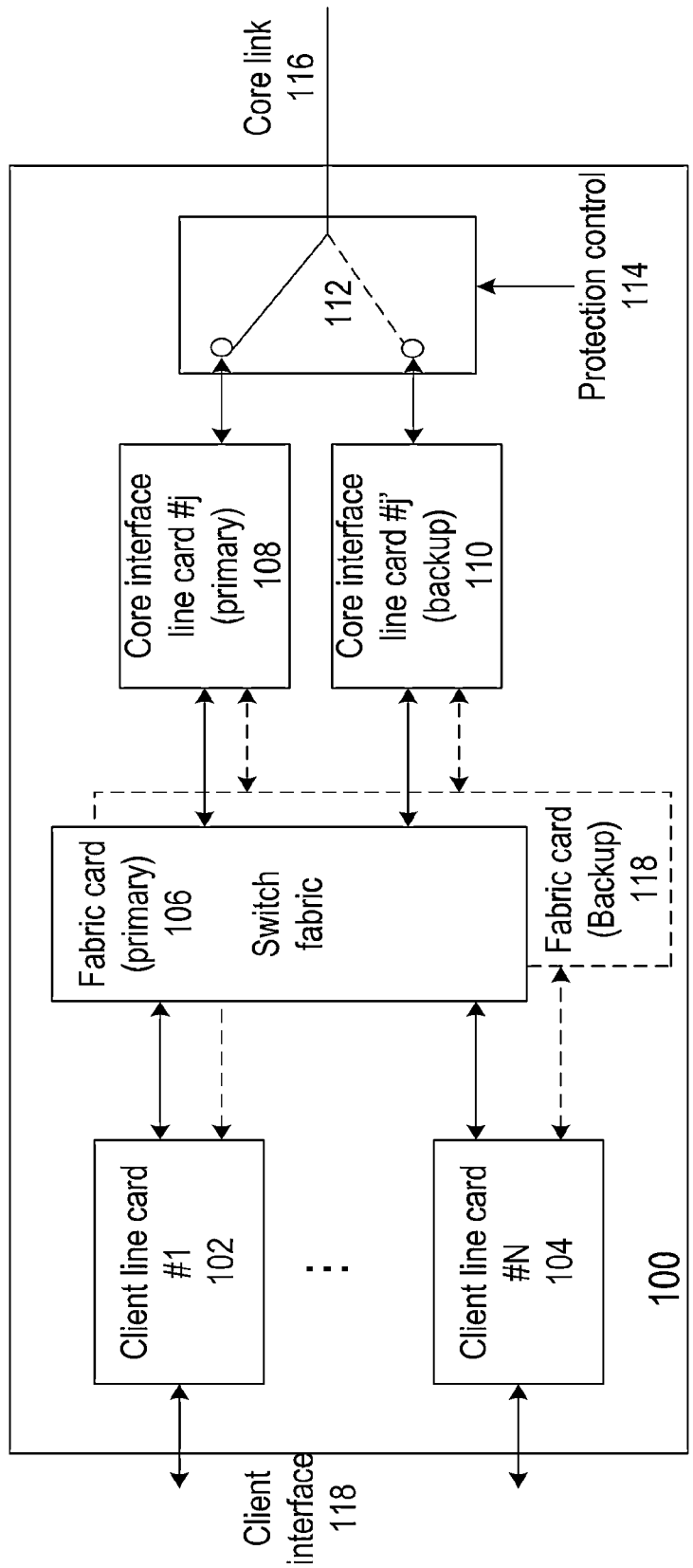
FIG. 1 shows a block diagram of a conventional line card with protection.

Systems that provide traffic received from the TDM line card with 1+1 protection are detailed in the following discussion. The preferred embodiment provides systems with cell switching, for traffic received from line card with 1+1 protection. The method given by preferred embodiment depends on the system configuration, using 1+1 switch fabric protection or 1:n switch fabric protection. In both cases, the destination port uses input buffer to support delayed read to enable traffic re-transmission or multiplexing from uncorrupted traffic. To support such feature, the format of switched cells is defined first, followed by detailed description for the embodiments using 1+1 fabric protection and then 1:n fabric protection.

OTN interfaces usually requires 1:1 or 1+1 protection, which means one (the primary) line card is in regular working mode, while the other (backup) one is in standby or protecting mode, and is ready to be in working mode when the primary line card fails. The key difference between 1+1 and 1:1 link protection falls into the fact whether the secondary (protection) path carries the same user traffic or not. With 1+1 technique, the protecting module processes the inputs the same way as the working module, and the protecting link carries the same traffic as well; the receiver side or output multiplexer would pick the preferred one, either by configuration or by quality (e.g., BER). In contrast, 1:1 technique in general puts the protection path in standby mode (no actual traffic passes through) and is activated for real traffic processing when the primary path fails. For hitless case, only 1+1 is possible because of synchronization and fast link switching requirement. The switch fabric can be either 1:1/1+1 or 1:N protection, to have one (or N) in working mode and another one for protection.

The system has 1:1/1+1 protection for switch fabric and OTN interface. The optical connection of both OTN line cards are connected to a protecting switch (or a multiplexer, or other solution that has fast on/off control over input optical signal) to select the desired connection (either primary line card or protecting one) to the optical network. The connection to the optical network is further connected to a port of WSS (wavelength selective switch) or ROADM (reconfigurable optical add-drop multiplexer) for optical switching.

OTN uses frame alignment signal (FAS) for frame aligning. The OTN frame is of fixed size (say size L), and FAS field is located at the beginning of each frame. In an example OTN receiver, after system reset, it searches for FAS within the incoming data stream. After first FAS match, the internal data and phase alignment is adjusted to the newly found FAS. The receiver keeps on checking the FAS pattern for certain period, and in case all the checking matches, it will reach in-frame state. In this state it keeps on monitoring the FAS pattern for each frame, and if there is mismatch for a pre-configured number of frames, it will switch into out-of-frame state which means loss of frame synchronization. When switching from primary line card to the backup one, bit misalignment will cause bit(s) missing or duplication. Either case will cause continuous FAS checking failure and finally enter out-of-frame state which is not allowed. So with prior art, to achieve hitless protection, the transmitted/received bits from working and protecting links must be aligned to avoid out-of-frame state. However with 100G transmission link, consider the popular QPSK modulation with polarization multiplexing, the serial data rate is around 25 Gb/s which is equivalent to 40 pico-second, and the alignment will be extremely difficult. The system using present invention can align the output signals at the optical multiplexing point in a much simplified way.

The primary and backup line cards must have the same data (or ODU payload) encapsulated in the same tributary slot, so that when switching from primary line card to the backup one, the receiver will have continuous data stream. This requires both data input to the framer and the framer operation to be aligned between the two line cards. In cell or packet based switching systems, data arrived at different line cards from switch fabric may have different delay caused either by traffic manager or switch fabric scheduling. Such delay is compensated by the system to reach payload alignment.

Cell loss or duplication avoidance is also done. This mainly refers to the direction that ODU data switched from a protected line card to certain destination line card. Similar to the analysis of frame synchronization, the traffic managers may have different delay between the primary and backup line cards. Such delay difference can cause cell/packet loss or duplication. For example, if the traffic manager in the primary line card sends cells to the destination line card earlier than the backup line card, it is possible for the destination line card to put cell i from the primary line card in time slot s, while the same cell from backup line card in time slot s+1. The system avoids this situation to keep payload continuity.

Turning now to the cell format definition, the preferred embodiment uses Optical channel Data Unit (ODU), the digital path layer for the Optical Transport Network (OTN). ODU switching can be done in the OTN line card as example, but the method can be applied to other line card as well. The receiver processes the traffic on a flow-basis. The "flow" can be classified by traffic's originating port (i.e., source port), destination port, and other information like priority. In ODU switching case, each ODU slot being switched can be treated as one flow. Each flow is mapped to one queue (or virtual queue). To support finest switching granularity (i.e., ODU0 switching) in OTN4 line card, the total number of flows needs to be larger than 80 (ODU4 has 80 tributary slots or TS; ODU0 occupies one of these TS). In packet-based (or packet/TDM mixed) switching systems, the number of flows supported in one port can be as much as 32K, which is much larger than the maximum number of TDM (ODU) flows. This flow information can be used to identify a particular cell, with added timestamp (or sequence number). To simplify the processing in destination port, per-flow sequence number is preferred for its continuity. The number of bits needed for this sequence number can be decided by the maximum number of cells to be buffered for each flow. In TDM case, this number is usually small (depends on the switching jitter or skew, which is usually less than 100 cells), but in packet case, it may require to buffer as much as 10 ms, which is equivalent to around 2M (i.e., 22-bit) frames in case of 100G line card and 64-byte frame size.

For packet services and the support of multi-granularity ODU switching, the core nodes usually use cell (fixed-size) or packet (variable-size) based switching through a central switch fabric. The line cards function includes line interface, traffic processing, segmentation, traffic management, and fabric interface. Line interface includes traffic framing/deframing and physical interface. For OTN interface, this refers to an OTN framer for packet or other services encapsulation (e.g., mapping Ethernet packet to Optical channel Payload Unit (OPU) using Generic Framing Procedure (GFP)), OPU to ODU encapsulation, ODU mapping, and OTN framing. Traffic segmentation then divides the traffic into fixed or variable sized packets. Traffic manager is responsible for queue management and ingress/egress traffic scheduling. Fabric interface interacts with fabric card (or destination port) to get permission for sending traffic. Other functions such as finer granularity ODU switching are also integrated in line cards. Fabric card provides switching path for the line cards through switching fabric devices, which is shared among different traffic and service types.

One implementation uses a unified cell format for TDM and packet traffic. To support 32K flows and 10 ms packet buffering, 15-bit flow ID and 22-bit sequence number can be defined for each cell. In one embodiment, to reduce the switching overhead, multiple flows that share the same policy (e.g., share the same aggregated bandwidth or have the same priority) can be aggregated. In case hitless protection is integrated with traffic management module, in one embodiment, the flow ID can be the same field as in switching header.

Table 1 is an example header format for fabric interface, where "flow" can be the combination of TRAFFIC_CLASS, SRC_SYS_PORT, and OUT_FAP_PORT. In applications where the traffic management device does not support hitless protection, and the interface to that device does not include flow information, additional field will be needed in packets/cells entering the traffic manager for both flow ID and sequence number. In one embodiment, this additional field is attached to the end of a packet/cell, as shown in FIG. 2. In another embodiment, this field is attached in front of the packet and behind the interface header, as shown in FIG. 3.

TABLE 1

Example fabric interface packet header (prior art)

| Field | Size | Bit/s | Meaning |
| --- | --- | --- | --- |
| Version | 2 | 47:46 | Fabric Header Version |
| PACKET_SIZE | 14 | 45:32 | Size in bytes |
| TRAFFIC_CLASS | 3 | 31:29 | Class of service |
| SRC_SYS_PORT | 13 | 28:16 | Identify the system-level source port or physical port |
| OUT_FAP_PORT | 8 | 15:8 | Outgoing fabric-access-processor (FAP) port of the destination device |
| DP | 2 | 7:6 | Drop Precedence |
| RSVD | 4 | 5:2 | Reserved |
| EXCLUCE_SRC | 1 | 1 | Indicate whether to filter packet at the egress, if source system port is the same as destination system port |
| SYS_MC | 1 | 0 | Packet is system multicast |

Usually the TDM cell size is 64-byte, so the additional overhead for flow ID and sequence number will be relatively large, if the system uses same format as in packet mode. The preferred embodiment differentiates the TDM and packet traffic, by using one bit as a TYPE_INDICATION (for example, '0' for packet and '1' for TDM) and then defining the number of bits needed. As the flow ID is used in the destination port only, in one embodiment, it is allocated per line card without the source and destination port number. For example, a system may contain 4 ODU0 line cards, numbered from line card #0 to #3, each providing 20 ODU0 channels, and one OTN4 line card (numbered line card #4) to aggregate traffic from the 4 ODU0 line cards. For traffic switched to line card #4, the system may allocate flow ID 0 to 19 for those from line card #0, flow ID 20 to 39 for those from line card #1, and so on. With this approach, FIG. 4 shows an example frame format for TDM traffic where only 2 bytes are needed.

Next, cell synchronization in primary and backup line cards is discussed. For traffic from line card with 1+1 protection that needs to be switched through the switch fabric, the target is to avoid cell loss or duplication caused by switch fabric or primary line card failure. To simplify the operation in destination ports, in one embodiment the primary and backup line cards synchronizes their segmentation and sequence number for the segmented cells. For example, in the OTN case, the two line cards may synchronize their segmentation from a certain OTN frame, and use the same initial sequence number (for example, sequence number 0). In one embodiment, this synchronization involves a "sync" signal to indicate the start of synchronization. For system robustness, the synchronization signals include flow ID and sequence number. In one embodiment, this information is generated from working line card and sent to the backup one. To compensate for the signal path delay (both I/O delay and PCB trace delay), the sync signal may have certain offset to frame start.

Because of the fixed frame size and possible independent selection of cell size, a cell may span two different frames, or padding is needed to align with frame boundary. For the first case, in one embodiment, the synchronization is performed when the cell is aligned with frame boundary. In another embodiment, the synchronization signals include the mapping information for the first byte of a flow in a frame. The synchronization can be per-flow based. The synchronization may be issued once every frame, or once every several frames, or only when the segmentation is started. Each flow may have its own signals, or all the flows may share the same signal group.

Figure 5:
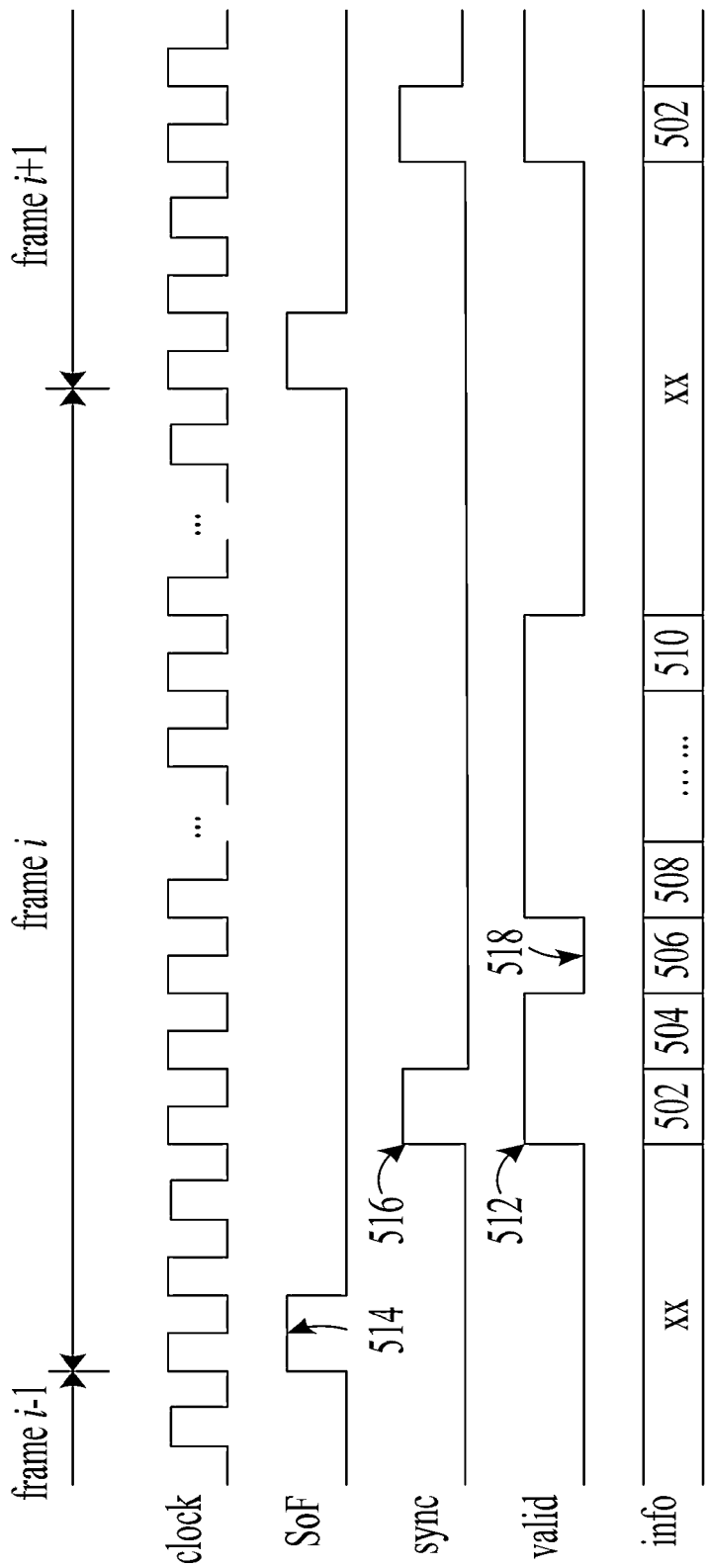
FIG. 5 shows an exemplary timing of segmentation synchronization.

FIG. 5 illustrates an example implementation with same signal group for all the flows, and information for each flow is exchanged once every frame. In FIG. 5, "clock" is the clock signal synchronous to PHY receiver; "SoF" is the input from PHY device indicating the start of a frame, such as indicated by pulse 514; "sync" pulse 516 is the indication that synchronization starts (for signals "valid" and "info"); "valid" is the indication for whether "info" signal contains valid information; "info" is the synchronizing information for the flows, for example starting from sync pulse 516, the clock cycles are allocated for flow 0, 1, . . . , such as cycle 502 for flow 0, 504 for flow 1, 506 for flow 2, and so on. When a flow is not to be synchronized in the current frame cycle, the "valid" signal in its corresponding clock cycle is inactive. For example, given the inactive "valid" in cycle 518, its correspondence flow 2 is not to be synchronized in frame i. "sync", "valid", and "info" are generated from working line card and sent to backup one.

One embodiment uses a modified receiver state machine to help to eliminate the constraint of time alignment, so that the transmitter only needs to align the center of the signal eye between the two interfaces. Instead of having a single FAS checking element, the modified receiver can have multiple instances to work in parallel, with one instance as primary and the outputs from others only considered when the primary one encounters FAS loss. Using FAS starting point detected by the primary element as reference, each of the other FAS checking element checks for different offset. For example, name all these checking elements from $E_{-n}$ to $E_n$ ("n" gives the maximum tolerance of bit skew), and $E_0$ represents the primary element that detects the signals starting from time $t_0 + L_F * t_b$, where $L_F$ is the number of bits in each frame and $t_b$ is the period of a single bit, then $E_i$ ($i \in [-n, n]$) will check for FAS from time $t_0 + (L_F + i) * t_b$. The receiver state machine is modified as following:
1) Receiver enters in-frame state with regular procedure by FAS checking element $E_0$
2) Set all the other FAS checking elements to the desired starting point by referencing to $E_0$, and initialize FAS_change counter to 0
3) If $E_0$ detects loss of FAS, the detected FAS by $E_i$ (if any) will be used and the current frame alignment will use $E_i$ as reference; at the same time counter for FAS_change will be increased by one
4) If no FAS detected by any $E_i$ for pre-defined number of frames, the state machine will enter out-of-frame state
5) If the counter for FAS_change exceeds pre-defined threshold, change $E_0$ to the starting point detected by $E_i$, and go to step 2)

In most cases because of the transmitter side primary-to-backup switching time, the receiver will encounter one or more frames loss. If the receiver PLL can be locked within short period (e.g., several symbols time), by the proposed approach, the transmitter side phase alignment is even not necessary. For a transmitter with longer restoration time, the receiver PLL may lose locked state, and it may take longer time to recover. For such system, one solution is to keep the PLL in pseudo locked state, for example, if encounters loss-of-signal, the phase error may be set to zero, which in turn leaves frequency offset as constant value. This may help the PLL to re-lock faster, within several symbols. Under these conditions, the only constraint to the transmitter side is to have the bit skew limited within the maximum tolerance range (n-bit where 2n+1 is the total number of FAS checking elements).

To minimize the bit skew between the primary and backup links, in transmitter side a synchronization control signal is needed for the framers to initiate the frame transmission. This signal can be generated from a central point (for example, the switch fabric card) to all the line cards, or from the primary line card to the backup line card. It must be synchronized with a reference clock signal which is used to generate the serial transmission clock by a PLL inside the framer. Usually a framer device (or a serializer module) takes a reference clock as input and uses internal PLL to generate the high-frequency clock for serial output data. The high-frequency clock is phase-aligned with reference clock, and the serial output data is synchronized to the high-frequency clock (as shown in FIG. 5, where ref_clk is reference clock input, serial_clk is high-frequency clock for serial transmission, dout is serial data output, and sync is the synchronization control signal). Considering the dout skew from its generating clock (i.e., the high-frequency clock) is small, the dout skew between primary and backup line card will be small, in case their reference clocks are phase aligned at the point inputting to PLL, and the sync signals are aligned to the same ref_clk cycle. In practical design, this can be achieved by having ref_clk and sync signals generated from the same board and distributed to the primary and backup line cards using equal length traces.

The receiver processes the traffic in a flow-basis. The "flow" can be classified by traffic's originating port (i.e., source port), destination port, and other information like priority. In ODU switching case, each ODU slot being switched can be treated as one flow. Each flow is mapped to one queue (or virtual queue). To support finest switching granularity (i.e., ODU0 switching) in OTN4 line card, the total number of flows needs to be larger than 80 (ODU4 has 80 tributary slots or TS; ODU0 occupies one of these TS). In packet-based (or packet/TDM mixed) switching systems, the number of flows supported in one port can be as much as 32K, which is much larger than the maximum number of TDM (ODU) flows. This flow information can be used to identify a particular cell, with added timestamp (or sequence number). To simplify the processing in destination port, per-flow sequence number is preferred for its continuity. The number of bits needed for this sequence number can be decided by the maximum number of cells to be buffered for each flow. In TDM case, this number is usually small (depends on the switching jitter or skew, which is usually less than 100 cells), but in packet case, it may require to buffer as much as 10 ms, which is equivalent to around 2M (i.e., 22-bit) frames in case of 100G line card and 64-byte frame size.

Figure 6:
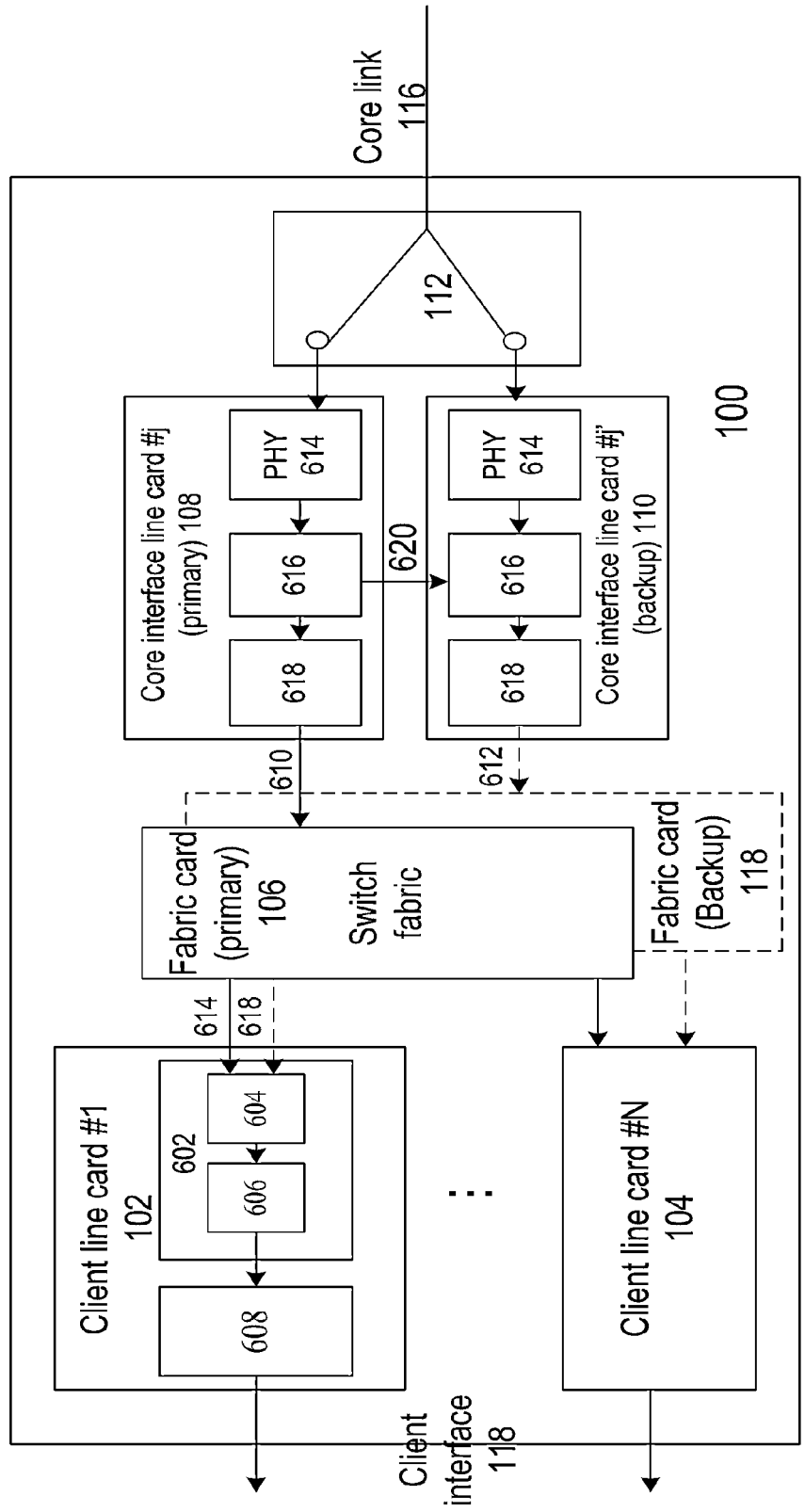
FIG. 6 shows exemplary primary and backup line cards using different switch fabric with 1+1 protection.

Next, a system that provides 1+1 switch fabric protection is discussed. The preferred embodiment uses 1+1 switch fabric protection, with the primary line card having its ingress traffic (to switch fabric) connected to primary fabric card, and the backup line card's ingress traffic to backup fabric card. The system block diagram is given in FIG. 6, as the extension from FIG. 1, with example of traffic from core line card (having 1+1 protection, such as primary line card 108 and backup line card 110) to client line cards such as 102 and 104. Primary line card 108 is connected to primary fabric card 106 through link 610, while backup line card 110 is connected to backup fabric card 118 through link 612. All the other line cards have connection to both fabric cards, such as line card 102 connected through link 614 and 618. Inside the line cards with 1+1 protection, for example line cards 108 and 110, the traffic is first received by PHY 614, followed by synchronized segmentation logic 616. This segmentation logic has signal connection 620 to deliver the above mentioned information for synchronization. Block 618 is the generic traffic manager, which takes inputs of segmented cells and interfaces with switch fabric. Both line card 108 and 110 works actively processing the same traffic, and synchronizes with each other by method mentioned above; both fabric cards are in active mode as well. Under these conditions, links 614 and 618 have same traffic (might having some skew or jitter) to client line card 102. Inside 102, traffic is first processed by traffic manager 602. The traffic manager has the feature to support hitless protection 604 as given in preferred embodiment, as well as traditional traffic management function 606. In one embodiment, protecting module 604 may be implemented outside of traffic manager 602. Traffic output from 602 is further processed by 608, which may include post processing and physical interface.

In regular operation, link 614 and 618 have same copy of traffic inputted into 604. Inside 604 there is control logic, which in regular mode selects the traffic originated from primary core line card 108 and drops that from 110. When system switches to protecting mode, i.e., either switch fabric 106 or backup line card 108 fails, the control logic selects traffic from 110. The preferred embodiment implements input buffers for these received cells and applies delayed read to compensate for input jitter and skew. In one embodiment, cells from both primary path 614 and backup path 618 are first written into such buffer.

Figure 7:
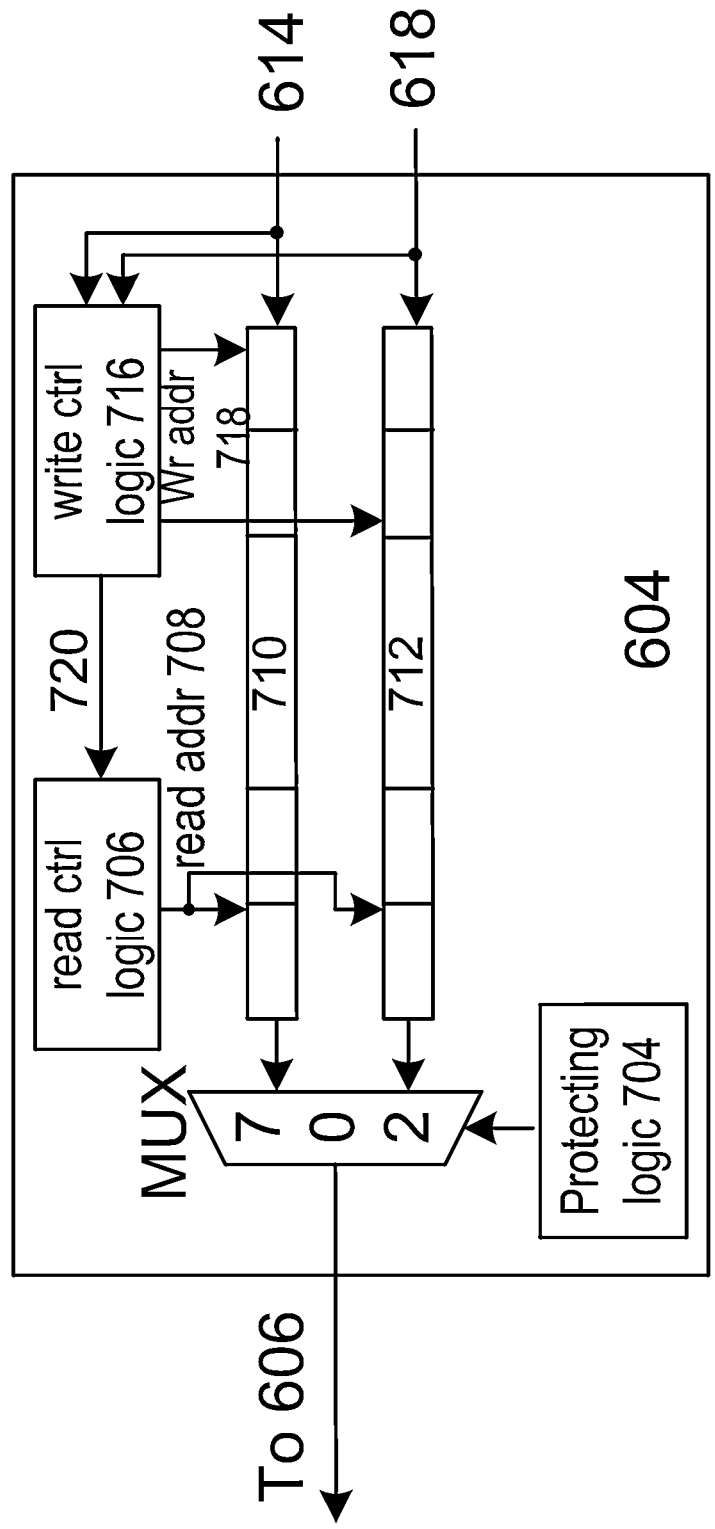
FIG. 7 shows an exemplary input from fabric interface to traffic manager with buffers for both primary and backup paths.

As an example implementation given in FIG. 7, input buffer 710 takes input from primary link 614, and buffer 712 has input from backup link 618. Both inputs are also connected to write control logic 716, to extract flow ID and sequence number, from which to generate the write address 718. Cell valid information from write control logic 716 is passed to read control logic 706 through signals 720. In one embodiment, such information may include cell flow ID and sequence number of the first cell. With received information, read control logic 706 generates read address for both buffers. Both buffers have same read address. The read enable is delayed from the valid signal received from 716 to compensate the input jitter and skew. In regular mode, protecting logic 704 selects cells from primary path 614 through multiplexer 702, while in backup mode, it selects from backup path 618. The output from 702 is connected to traditional traffic manager module 606. In one embodiment, the output has fixed rate and is relevant to physical interface rate. In another embodiment, output rate is controlled by input cell rate, giving one output per input cell, or one output credit for each sequence number increment to tolerant cell loss caused by switch fabric.

The preferred embodiment synchronously segments the incoming traffic in primary and backup line cards, and tags the segmented cells with the same labels which include sequence number and flow ID. In destination line card there is a buffer providing delayed read. When a cell is written into that buffer, its readout will be delayed for certain period, so that in case failure happens, it can avoid reading corrupted or invalid cells, either by selecting a different source, or by re-transmission from source port.

The preferred embodiment considers the system with either 1+1 fabric card protection, or 1:n fabric card protection, and provides different approaches accordingly. In one embodiment, with 1+1 fabric protection, the destination line card receives traffic from both primary and backup line cards. The destination line card has two buffers, one for traffic from primary line card, and the other for traffic from backup one. These two buffers provide the function of delayed read. A multiplexer is provided following the two buffers, to select which buffer to read from. In one embodiment, if there is another buffer following the multiplexer, the one for traffic from primary (or working) line card can be eliminated, and the delayed read will be controlled in the buffer following multiplexer.

In another embodiment, with 1:n fabric protection and 1+1 line card protection, a single copy is received in the destination line card, so it is the source line card's (in particular, the backup line card) responsibility to re-transmit the traffic that might be lost. The backup line card needs to be synchronized with primary line card in transmitting the traffic to switch fabric. In one embodiment, whenever the primary line card finishes the output of one cell, it sends the information to the backup one, so that the backup line card can release that cell from traffic manager main buffer. For the cells that might need to be re-transmitted, in one embodiment, the source port (backup line card) has a protecting buffer (or called re-transmission buffer), and for the cell to be released, it is read out from the main buffer and stored into the protecting buffer. In case protecting is triggered and re-transmission is needed, the source port will first read from the protecting buffer, and then continue with regular operation after re-transmission finishes. In one embodiment, the buffer is organized by time slot, and a "valid" bit is used in the buffer; in another embodiment, there are registers group to save the cells' starting address, and these registers are indexed by time slot. In one embodiment, no actual re-transmission buffers are used and the re-transmission is achieved by modifying the pointers to the main traffic queue. In destination port, buffer with delayed read is used, and the re-transmission is transparent.

For system that uses traffic manager not supporting hitless protection, in one embodiment, the above mentioned solutions can be implemented in FPGA located between physical device and the traffic manager. In another embodiment, it can be located between traffic manager and switch fabric device, with the function of bridging control message between traffic manager and switch fabric, if in-band control is in use.

Figure 8:
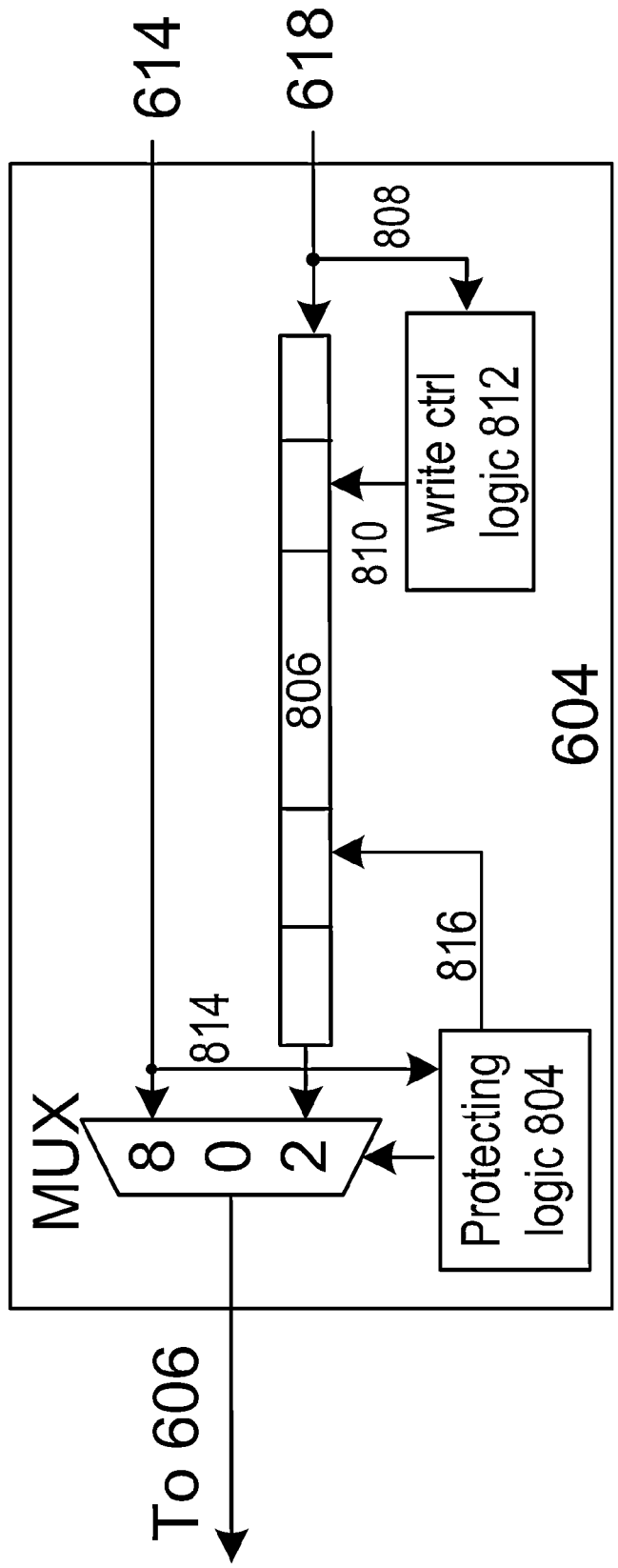
FIG. 8 shows an exemplary input from the fabric interface to traffic manager with a buffer only for the backup path.

In most cases there is additional buffer in subsequent processing path, so in order to reduce the required memory capacity, buffer 710 in FIG. 7 for primary path can be eliminated and the delay/jitter compensating function can be put into that subsequent buffer (inside module 606). This embodiment is illustrated in FIG. 8. Cells from primary path 614 are connected to multiplexer directly. The flow ID and sequence number information are also sent to protecting logic 804 for protecting purpose. A single buffer 806 is used for cells from backup path 618. Like FIG. 7, the flow ID and sequence number of input cells are also extracted to write control logic 812, to control the writing of buffer 806. In regular mode, protecting logic 804 has the multiplexer to select primary path 614. Inside logic 606, there is delayed read operation to compensate for switching jitter and skew. When switching from primary to backup path, by delaying several cell cycles (for the compensation of switching jitter and skew caused by the backup path), the protecting logic 804 may use (partial of) the sequence number of the last cell received from primary path to form the read address for input buffer 806, and make multiplexer 802 output from this read data. In one embodiment, the backup buffer read out rate is controlled by input cell rate from backup path—one cell input, then readout one. In one embodiment, output rate from backup buffer is controlled by input cell rate, giving one output per input cell, or one output credit for each sequence number increment to tolerant cell loss caused by switch fabric.

To support multiple flows, or multiple ODU slots, one embodiment of the preferred embodiment organizes the buffer by flow ID, and to have the buffer size enough to compensate the failure detecting/reacting delay and switching jitter. Each cell is accessed through the corresponding flow ID and last several digits of sequence number.

Next, the provision of 1:n switch fabric protection is discussed. The preferred embodiment uses 1:n protection, which has one switching board to protect the other n board(s). Alternatively, under normal operation, all the (n+1) switching boards may be in working mode with traffic equally distributed, and in case one switching board encounters failure, the traffic will be switched through the other n switching boards.

Figure 9:
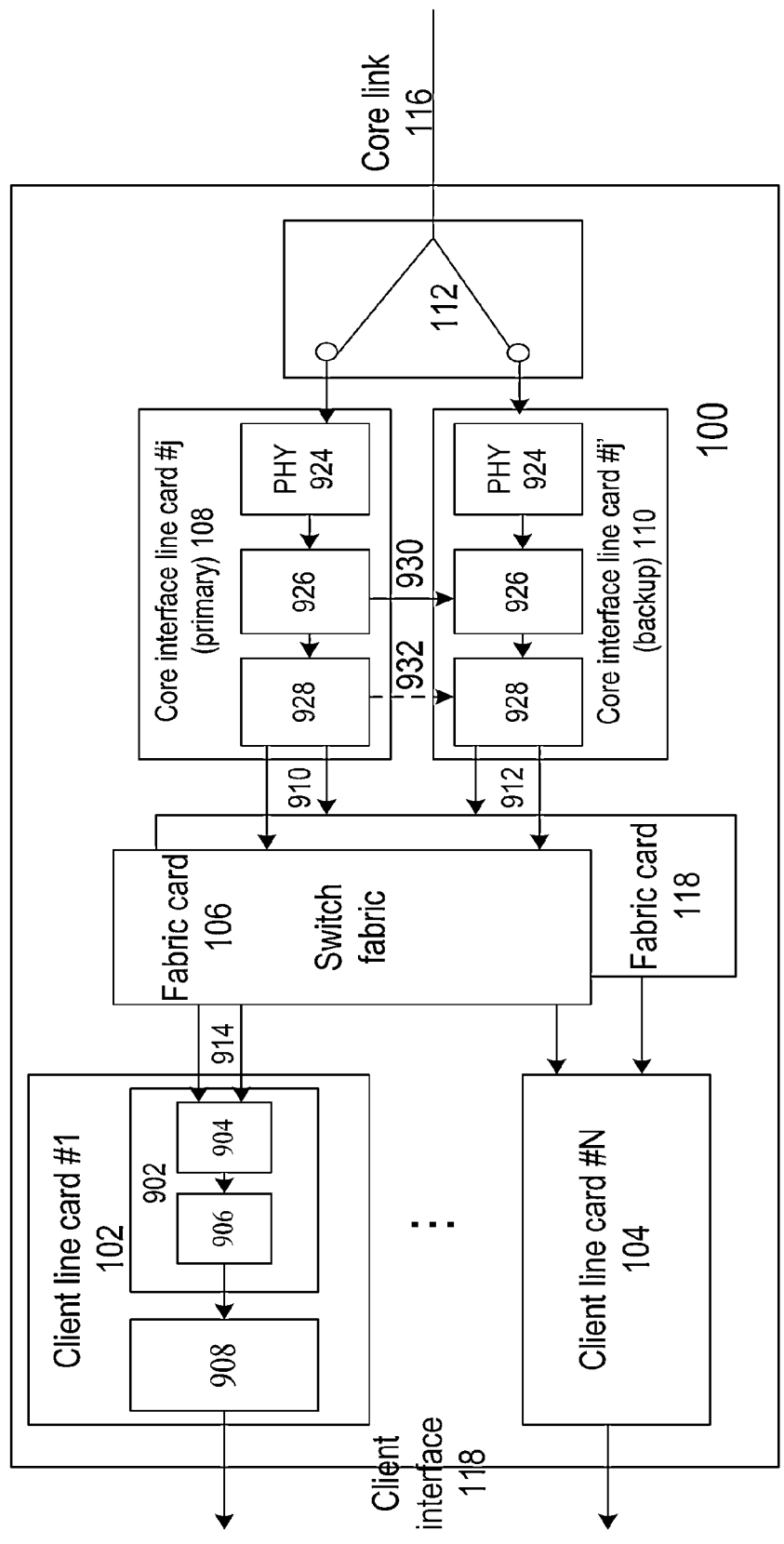
FIG. 9 shows exemplary primary and backup line cards using different switch fabrics with 1+1 protection.

One exemplary system block diagram is shown in FIG. 9. Internal modules and path connections 902 through 930 are the same with those in FIG. 6, except that module 928 has the protecting features to be introduced in the preferred embodiment, and module 904 is simplified comparing to the embodiments given above. In this system, multiple fabric cards are presented in the system, such as fabric card 106 and 118. Every line card is connected to all the fabric cards, for example line card 108 has connection to fabric cards 106 and 118 through link 910. Signal path 932 is to be used for transmitted cell information exchange, for the features implemented in source port traffic manager as one embodiment of the preferred embodiment. Unlike in FIG. 6 that protecting module in destination port receives two copies of traffic from path 614 and 618, in the embodiment of FIG. 9, the signal path 914 provides a single copy to module 904.

Failure protection is discussed next. In the configuration of FIG. 9, two different failure modes are considered: fabric failure and primary line card failure. Fabric failure may cause several cells loss or corruption, but the line card keeps working, so it is the primary line card's responsibility to re-transmit the lost or corrupted cells; in case of primary line card failure, the system needs to use the backup line card as working one, and it is the backup line card's responsibility to re-transmit the lost or corrupted cells.

Next, the protection for fabric failure is discussed in detail. To enable the aforementioned cell re-transmission, in one embodiment the line card has a buffer (for example the protecting buffer) to save the cells recently transmitted, so that when fabric failure detected, it will hold the read-out from regular buffers and first re-transmit those in the protecting buffer.

Figure 10:
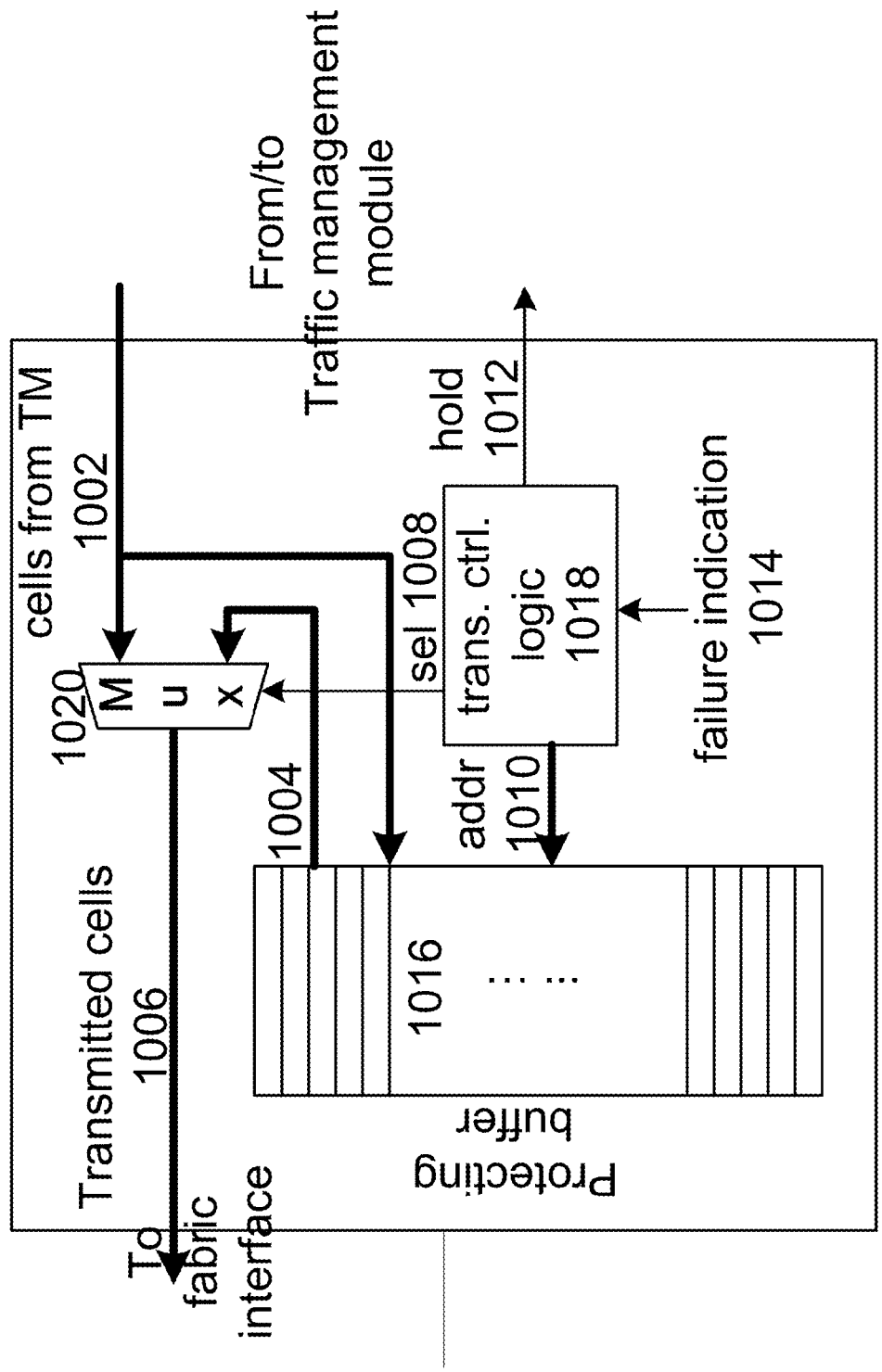
FIG. 10 shows an exemplary block diagram for cells re-transmission during fabric failure.

FIG. 10 shows one embodiment of the preferred embodiment. Cells input 1002 from traffic manager are connected to multiplexer 1020, protecting buffer 1016, and transmission control logic 1018. In regular mode, transmission control logic 1018 selects cells 1002 as the transmitted cells 1006. With cell 1002 header information (such as flow ID and sequence number), transmission control logic generates protecting buffer 1016 writing address 1010 and controls the writing. When failure is indicated by signal 1014 (i.e., switching to protecting module), control logic 1018 activates "hold" signal 1012 to pause the transmission from traffic manager, and outputs cells saved in protecting buffer 1016. When re-transmission is finished, "hold" signal 1012 is deactivated and the regular operation is resumed. Define the maximum delay from the time a cell starts to enter the switch fabric to the time it is completely outputted by the switch fabric as Td, and the detected failure time as tf, then only the cells transmitted after tr=(tf−Td) will be re-transmitted, and this is the method transmission control logic 1018 generating the buffer read address. The minimum buffer size can be (cells_outputting_rate×Td).

Figure 11:
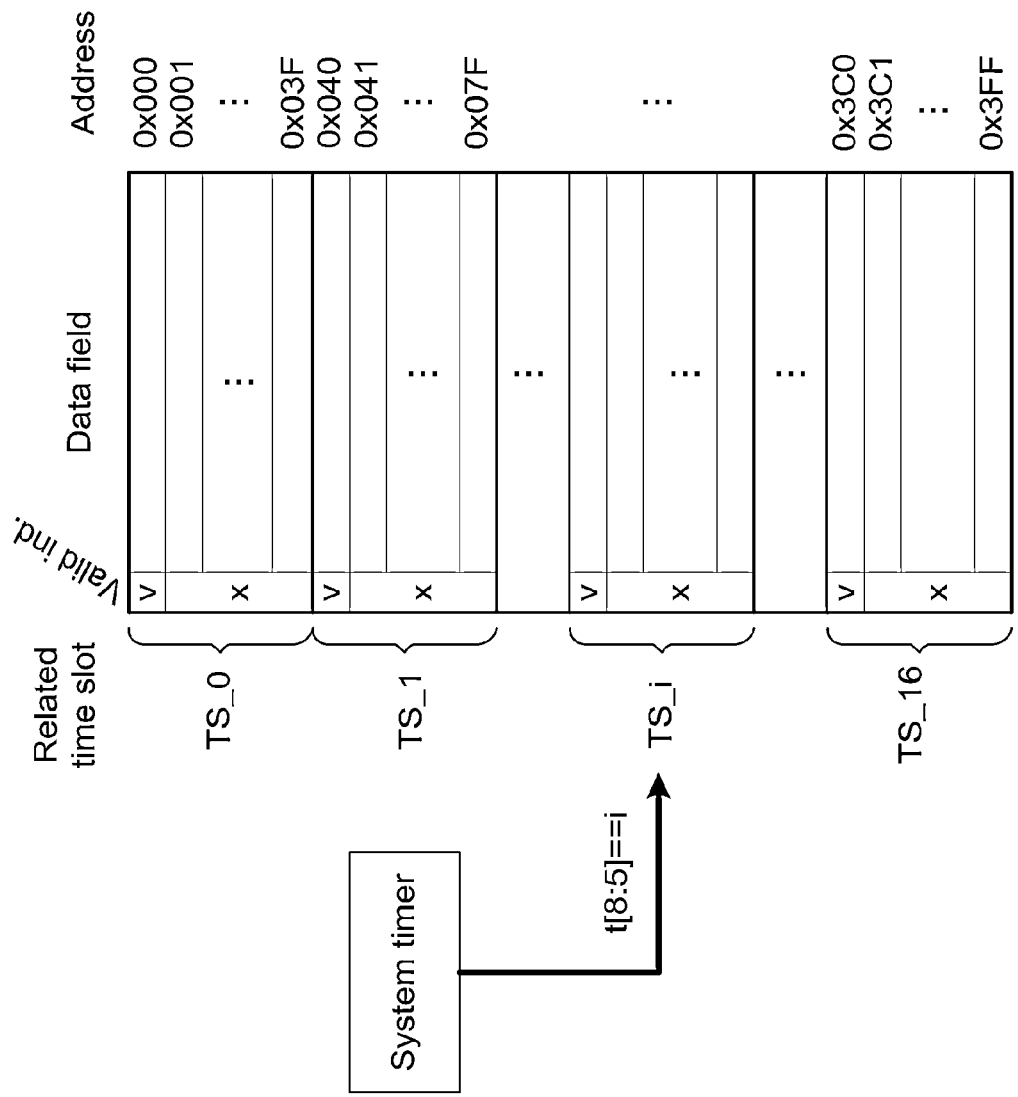
FIG. 11 shows an exemplary re-transmission buffer indexed by a time slot.

The protecting buffer can be organized using certain bits of a system timer as buffer access address: time is divided into fixed-interval time slots, and each time slot is no longer than one cell transmission time. For each cell being transmitted, the cell content is written into the protecting buffer with address extracted from that particular time slot. For example, consider a system timer of 48 bits, each time slot contains 32 clock cycles (by system timer); 64-word as the length of each cell, and buffer access address of 10-bit. Then buffer address bits [5:0] can be generated from the offset within a cell; address bits [9:6] can be generated from system timer bits [8:5]. Besides the data word, another bit is needed for valid cell indication. This bit can be one extended bit of the buffer width, or using flip-flop registers. It will be set to '1' if in its corresponding time slot a valid cell is transmitted/written into, or '0' if no valid cell during that slot. This is shown in FIG. 11, where 'v' is valid indication, 'x' is "don't care", and "TS_i" is the buffer space allocated for time slot i. When switching to protecting mode, the initial buffer access pointer is calculated by current time slot value (system timer bit[8:5] in the above example) minus the number of time slots to be re-transmitted.

Figure 12:
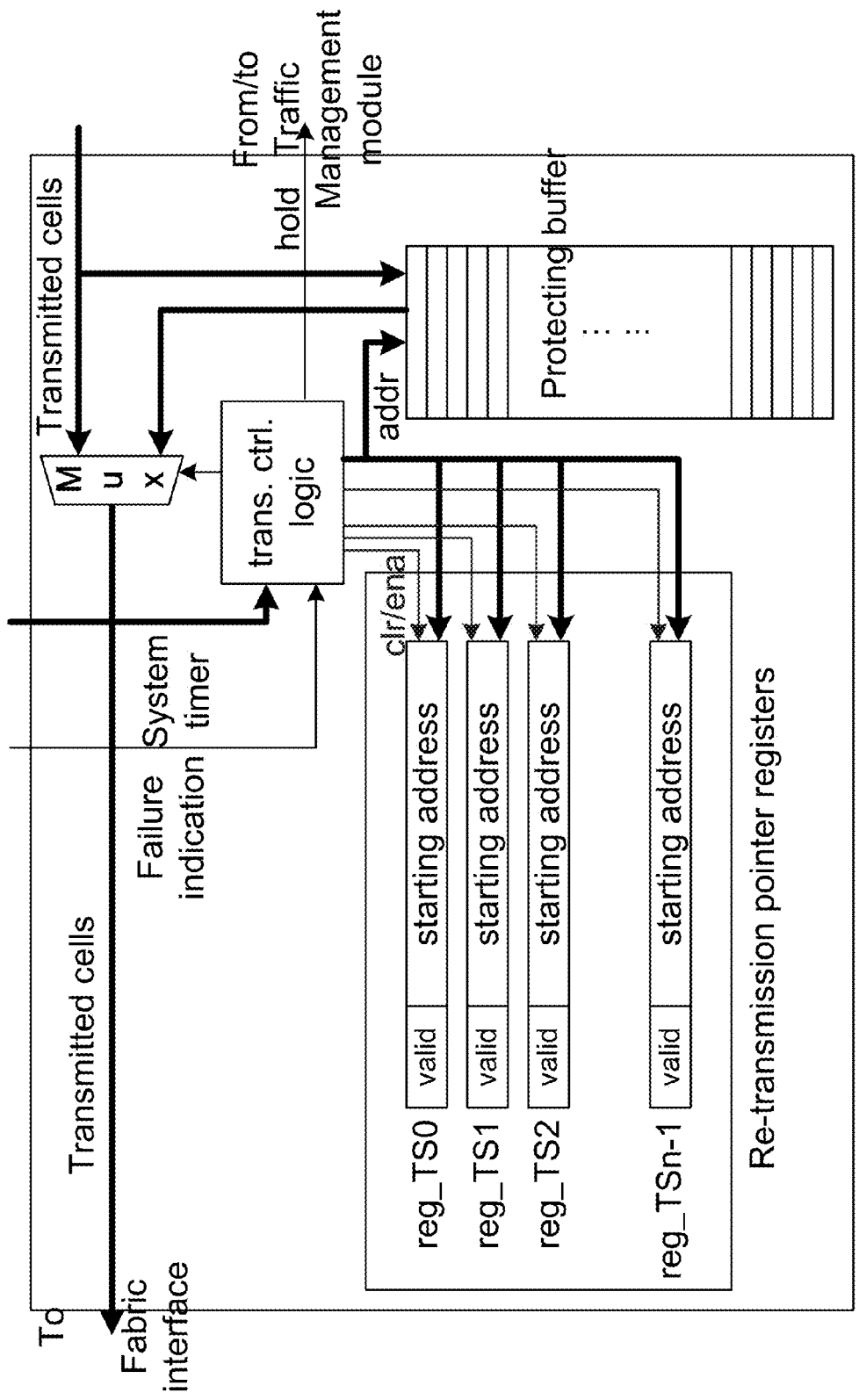
FIG. 12 shows an exemplary re-transmission buffer indexed by pointer registers.

Another embodiment uses registers to save valid cell pointers while incrementally writing the protecting buffer. Assume there are cells of maximum S time slots to be re-transmitted, then there are S such pointer registers, each register has its corresponding time slot and is indexed by certain bits of system timer. Each register has a valid bit to indicate whether there are cells to be re-transmitted or not. When its time slot comes, the valid bit of the corresponding register is first cleared to '0'; from that on, if a cell is written into the re-transmission buffer, the valid bit will be set to '1' and the writing address will be loaded into the register. Once set, this register will not be written again until its next time slot comes. When fabric failure happens, the protecting module takes the current value of system timer and calculates the time slot to re-transmit from, then using the calculated time slot to index the register, further to check whether there are valid cells to be re-transmitted and the address to start re-transmission from. FIG. 12 is the block diagram to illustrate this solution. Transmission control logic is the main module to control cell re-transmission. Reg_TSi is the register for each time slot, indexed by bits [k:l] of system timer. Protecting buffer is linearly incremented as valid cells transmitted. Same as FIG. 10, the transmission control logic generates the output to fabric interface, by multiplexing the cells either from regular management module or protecting buffer. In case re-transmission is needed, a "hold" signal is sent to management module until re-transmission finishes. The transmission control logic uses system timer to generate the control signals of the registers, including clear signal for valid bit and pointer load enable. Register enable signal is set by the indication of corresponding time slot, and cleared when a valid cell is written into the re-transmission buffer.

Next, the protection against line card failure is detailed. For line card protection, the primary source port notifies the backup one when it finishes the transmission of one cell to fabric interface. This notification may include the flow ID and sequence number. Once the backup line card receives the notification, it releases the corresponding cell from its queue. To reduce the bandwidth requirement for this notification, because the two line cards are synchronized, the sequence number may not be sent, or only sent once in several cell cycles. When the primary line card fails, the backup one simply activates its scheduler and transmits the cells as it does in normal mode.

The integration with a traffic scheduler is discussed next. The above discussion does not consider output scheduling for traffic sending to fabric interface, which is usually needed in practical case. When such scheduling is needed, both re-transmission module and the module for regular operation will be located behind the output scheduler. The output request for each queue is "OR-ed" by a valid signal (which is active when there is cell to be re-transmitted from that queue) from re-transmission module and that from regular operation module. When a "grant" is received for certain queue, if there is valid cell(s) for that queue in re-transmission module, a cell will be read from there; otherwise the "grant" will be passed to regular operation module. In such case, the "hold" signal and output multiplexer in FIG. 10 and FIG. 12 may not be needed anymore.

Next, the use of traffic buffer in traffic manager is discussed. One embodiment uses additional buffer for the cells to be re-transmitted when protecting mode is activated. These are the add-on solutions to existing traffic manager design, in that the existing modules can be kept untouched, with re-transmission logic inserted between the scheduler and queue management modules. This add-on will be able to help reduce the design risk. Alternatively, this additional buffer can be eliminated by modifying the existing traffic manger design to use regular traffic buffer.

Figure 13:
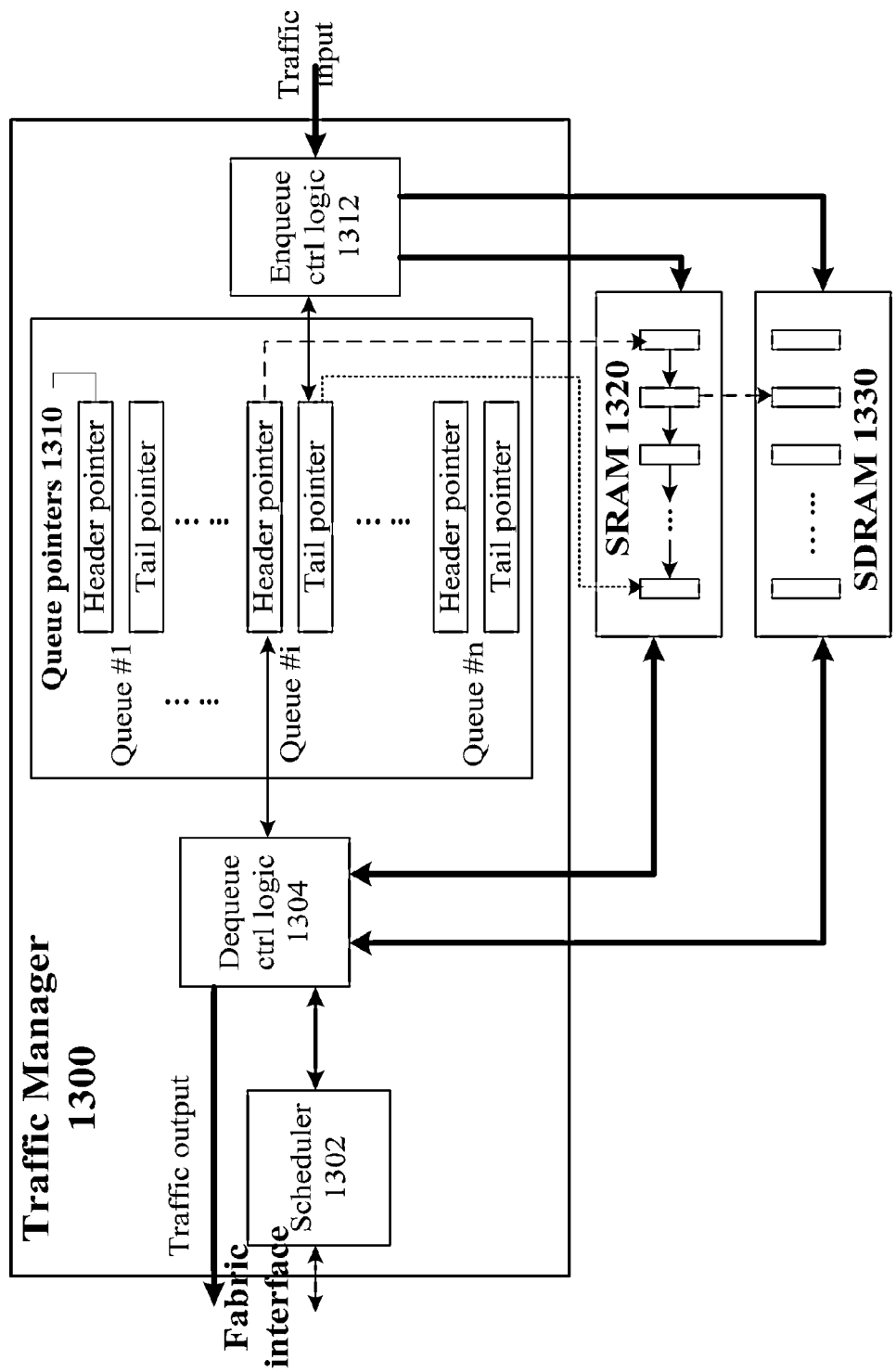
FIG. 13 shows an exemplary example traffic manager block diagram.

FIG. 13 shows an exemplary use of traffic buffer with a traffic manager 1300. It includes traffic manager device 1300 and external buffers for both pointers (by SRAM 1320) and traffic (by SDRAM 1330). Inside the traffic manager device 1300, there are enqueue control logic 1312, dequeue control logic 1304, scheduler 1302, and queue pointers 1310. Enqueue control logic manages the queue tail pointers and stores the received traffic into buffers; dequeue control logic interacts with scheduler for traffic to be sent, reads from buffers, and manages the queue header pointers. Scheduler interacts with switch fabric (or destination port) for permission to transmit traffic. SRAM is organized in links to store the pointers of cells buffered in SDRAM, using one link for each queue. The link headers are saved in header pointers in traffic manager device, while link tails are saved in tail pointers. Whenever a cell is read from its queue, the corresponding header pointer will be modified to its next element, and the current space is released. Besides the queue pointers given in FIG. 13, one embodiment of the preferred embodiment adds buffers or registers to save (header) pointers of cells that might need to be re-transmitted. Instead of storing all the cells to be re-transmitted, this embodiment only saves the header pointers, and the cells are still in the same buffer as they are in regular operation. The buffer space is only released when the cell got retransmitted (in case of failure), or it is no longer in the re-transmission range. The organization method for these pointers can be same as those proposed in FIG. 11 and FIG. 12.

The operation with a destination port is discussed next. In destination port, buffers are organized by flow ID and sequence number. When a cell is received for a particular flow, its sequence number is used as index to the buffer for writing. The protection in source port or switch fabric is transparent to the destination port: when switched to protecting mode, the re-transmitted cells will be re-written into the same buffer as those already sent (if any) before failure. This requires the buffer size in destination port to be larger than the re-transmission buffer size plus maximum fabric skew and jitter. This is also the minimum delay between a cell's arrival time and its read out time, so that the re-transmitted cells always comes earlier than they are read out. The same approach for this configuration can be applied to 1+1 switch fabric protection as well.

"Egress" is referenced to the switching node, for the traffic in destination port and to be transmitted to physical link. Because both the primary and backup line cards actively accept traffic from same source ports, the key step is to align the cells with same sequence number and flow ID into the same transmitting position. Here "position" means the frame number and the mapping inside the payload. In OTN, each frame has fixed length, and the bandwidth is organized by tributary slot (TS). Each OTN frame has multiple TS interleaved to support ODU multiplexing. The TS can be either 1.25 Gb/s or 2.5 Gb/s. For example, ODU4 has 80×1.25 Gb/s TS, which can support 80×ODU0 or 40×ODU1 or 10×ODU2; ODU3 has 32×1.25 Gb/s TS, which can support 32×ODU0 or 16×ODU1 or 4×ODU2, or 16×2.5 Gb/s TS to support 16×ODU1 or 4×ODU2. In one example, a tributary slot allocation for OPU3 using 2.5 Gb/s rate, in which each tributary slot has 238×4=952 bytes for one frame. Another tributary slot allocation scheme in OPU4 uses 1.25 Gb/s rate, in which each tributary slot has 190 bytes in one frame.

Figure 14:
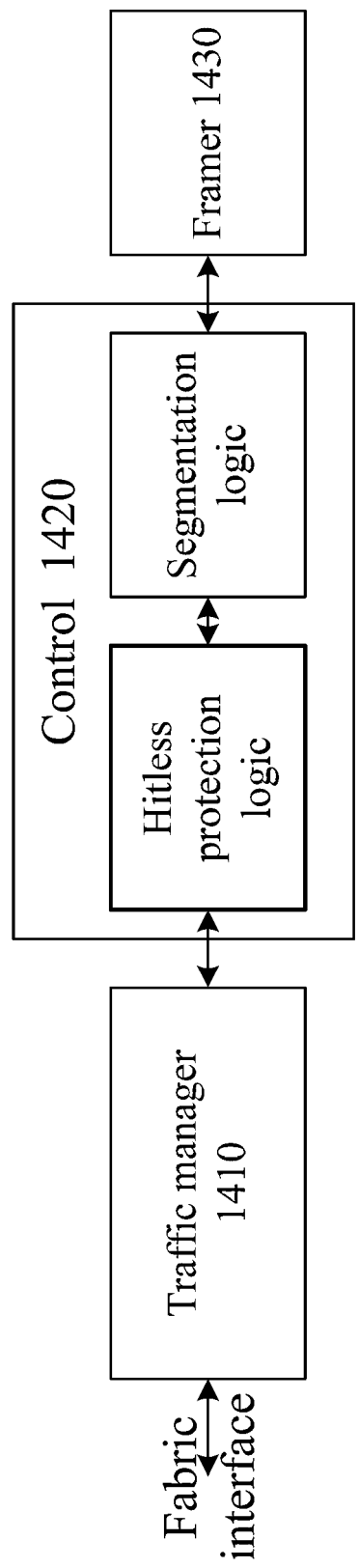
FIG. 14 shows an exemplary hitless protection logic independent of traffic manager.

Hitless protection independent of traffic manager is discussed next. In most cases, equipment vendors use third-party traffic manager and switch fabric devices that do not support hitless protection, and such feature has to be implemented in traffic manager interface device which is usually one or more control units 1420 that can be FPGAs (Field Programmable Gate Array). Control 1420 includes the traffic manager 1410 that interfaces with the fabric and communicates with the hitless protection logic and segmentation logic that communicates with framer 1430. This is shown in FIG. 14. The solutions for the above two cases (1+1 fabric protection and 1:n fabric protection) can both be applied, if the traffic manager and switch fabric meet the following conditions:

1) Switching capacity is larger than required ODU switching bandwidth: this is to avoid cells queuing inside traffic manager and possible cell loss 2) Each flow is served with lowest latency: together with condition 1), this guarantees shortest latency for each flow from the time it enters the source port traffic manager to the time it is outputted by the destination port traffic manger 3) For system supporting both ODU switching and packet switching, ODU service is set to highest priority and encounters lowest latency These are achievable because the cells are generated locally with fixed rate, and consume fixed fabric bandwidth. These conditions provide lowest and predictable latency for a cell travelling through the traffic manager and switch fabric, so that the required buffer size for hitless protection is minimized.

Though the above description explains the system with working and protecting line cards connected to the same receiving link, the same invention can be used in system connecting to separate working and protecting links as well.

The foregoing discloses a complete ODU switching system from physical link to system switching. The system provides physical link protection that includes transmitter side delay tuning by external delay lines, and receiver side synchronization detecting state machine modification. For system internal cell switching, the system includes cell transmission alignment and synchronization for protected line card, and cell loss/duplication avoidance caused by switch fabric or primary line card failure. The systems and methods discussed above use minimum buffer and smallest resource to achieve hitless protection.

What is claimed is:

1. A communication system, comprising:
a synchronous interface coupled to a switch fabric; cells which are switched;
a 1+1 protection unit with a primary and back-up line cards including a buffer to store cells used for transmission during a communication failure, wherein a minimum buffer size is defined as {cells outputting rate×Td}, where Td is a maximum delay from the time a cell starts to enter the switch fabric to the time the cell is completely outputted by the switch fabric, and tf is a detected failure time; and a transmission control logic generating a buffer read address where only cells transmitted after tr={tf−Td} will be re-transmitted.

2. The system of claim 1, wherein the synchronous interface comprises SONET or OTN.

3. The system of claim 2, comprising multiple frame start tracking modules, to search for frame start shifting in case of protection switching.

4. The system of claim 1, wherein the switch fabric includes 1+1 protection.

5. The system of claim 1, comprising a destination port coupled to each line card to receive two copies of traffic from both line cards.

6. The system of claim 1, comprising a buffer coupled to the synchronous interface to receive traffic from primary line card is integrated with a traffic manager output buffer, and wherein the buffer performs a delayed read.

7. The system of claim 6, wherein a buffer write address is generated from a sequence number and a flow identification of incoming traffic and wherein a read address is generated from the sequence number and flow identification of primary traffic.

8. The system of claim 1, wherein the primary line card sends information to back-up line card to synchronize segmentation, wherein a cell may span two frames and wherein a cell size is selected independent of frame size.

9. The system of claim 1, wherein each frame's cells are aligned with a frame boundary and wherein the cell has a cell size selected from a fractional frame size or a fixed cell size with cell padding.

10. The system of claim 1, wherein synchronization information is sent only once for the first cell, once every several frames, or once every frame.

11. The system of claim 1, wherein information is sent several clock cycles late from a PHY start_of_frame indication, to tolerate printed circuit board and I/O delay.

12. The system of claim 1, comprising a source port that controls the traffic for re-transmission.

13. The system of claim 1, wherein traffic to be re-transmitted is saved in a buffer while the original copy is sent.

14. The system of claim 1, wherein buffered traffic is transmitted first when failure occurs, and after that regular traffic is sent.

15. The system of claim 1, comprising The buffer is organized by system time slot; a valid bit is used to indicate whether a cell is transmitted in that slot.

16. The system of claim 1, comprising a system time slot shorter than one cell transmission period.

17. The system of claim 1, comprising the buffer is indexed by pointer registers, which is further organized by system time slot.

18. The system of claim 1, comprising a re-transmission module coupled to a fabric interface scheduler, and wherein a request to scheduler is OR-ed by the re-transmission module and a traffic manager and wherein a grant from the scheduler is first used by the re-transmission module, and then by the traffic manager.

19. The system of claim 1, comprising a buffer for re-transmission, wherein the buffer is logical and managed using pointers.

20. The system of claim 1, wherein the primary line card sends predetermined traffic information to the backup line card, and the backup line card releases the predetermined traffic from its buffer.

21. The system of claim 20, wherein the released traffic is saved in re-transmission buffer for maximum re-transmission period.

22. A method for hitless protection, comprising: providing primary and back-up line cards coupled to a switch fabric to transmit or receive data frames with cells therein;

segmenting the cells in both line cards and identically tagging the cells;

labeling each cell tag with a sequence number; performing delayed read at a destination port to allow cell selection from a back up buffer or retransmission in case of failure using a buffer to store cells used for re-transmission during a communication failure, wherein a minimum buffer size is defined as {cells outputting rate×Td}, where Td is a maximum delay from the time a cell starts to enter the switch fabric to the time the cell is completely outputted by the switch fabric, and tf is a detected failure time; and generating a buffer read address where only cells transmitted after tr={tf−Td} will be re-transmitted.

* * * * *